United States Patent [19]
Torney

[11] 3,816,261

[45] June 11, 1974

[54] CULTURE MEDIUM FOR LERTOSPIRA ORGANISMS

[75] Inventor: Harry L. Torney, Indianapolis, Ind.

[73] Assignee: Johnson & Johnson, New Brunswick, N.J.

[22] Filed: Apr. 1, 1971

[21] Appl. No.: 130,542

Related U.S. Application Data

[63] Continuation of Ser. No. 725,519, April 30, 1968, abandoned.

[52] U.S. Cl. .................................. 195/96, 195/100
[51] Int. Cl. ............................................. C12k 1/06
[58] Field of Search ................ 195/100, 103.5 R, 96

[56] References Cited
OTHER PUBLICATIONS

Ellinghausen et al., "Am. J. Vet. Research" 26(110):39–44 (1965).

Ellinghausen et al., "Am. J. Vet. Research" 26(110):45–51 (1965).

Johnson et al., "J. Bact." 80:406–411 (1960).

Stalheim, "J. Bact." 92(4):946–951 (1966).

*Primary Examiner*—Alvin E. Tanenholtz
*Assistant Examiner*—Max D. Hensley
*Attorney, Agent, or Firm*—Salvatore R. Conte

[57] ABSTRACT

A chemically defined, protein-free culture medium embodying an anion-exchange resin and a water-soluble lipid source provides means for producing high yields of Leptospira organisms.

6 Claims, No Drawings

CULTURE MEDIUM FOR LERTOSPIRA ORGANISMS

This application is a continuation of Ser. No. 725,519, filed Apr. 30, 1968, now abandoned.

BACKGROUND OF THE INVENTION

A number of pathogenic leptospiral organisms are known to be of economic importance by reason of the fact that they cause disease, for example, in dogs and cattle. As prophylaxis for such disease, vaccines consisting of killed bacteria have been prepared from cultures of Leptospira organisms. In preparing such vaccines it would be desirable to have a high concentration of the organisms in the culture medium and to avoid the use therein of animal proteins which may sensitize the recipient of the vaccine. Further, it is desirable to avoid the use of proteins and the like natural products since such materials are subject to considerable variability from batch to batch. Various media for the growth of Leptospira organisms have been proposed. However, in order to obtain the desired rapid and abundant growth of organisms necessary for the efficient production of vaccines, it is heretofore been necessary to supplement such media with animal serum or albumin. A chemically defined medium free of animal protein would clearly be desirable.

Ellinghausen and McCullough (American Journal of Veterinary Research, Vol. 26, pages 39–51, January, 1965) have shown that Leptospira may be grown on a serum-free medium, provided a complex of albumin and lipid is supplied. These workers further showed that polysorbate 80 could serve as a lipid source for Leptospira but that excess lipid caused a falloff in growth.

SUMMARY OF THE INVENTION

In accordance with the present invention there is provided a protein-free composition suitable for large scale culture of Leptospira with excellent yields of organisms of high antigenicity. The composition comprises a buffered aqueous solution of glucose and essential amino acids, mineral salts and vitamins supplemented with a water-soluble lipid source and a detoxifying amount of a basic anion-exchange resin.

In carrying out the invention the medium may be prepared directly by dissolving together in distilled water each of the required ingredients and adding to the resulting solution the required detoxifying amount of ion exchange resin and the water-soluble lipid source. Alternatively in the latter step the lipid source and ion exchange resin may be mixed together separately, with heating if desired, and added together to the solution of other essential ingredients. In practice, it is convenient to supply the essential amino acids and vitamins primarily from a concentrated form of one of the standard chemically defined media such as Medium 199 of Morgan and Parker or preferably Eagle's Minimum Essential Medium (Science, Vol. 130, p. 433 (1959)) and to add further salts, vitamins and the like to provide the desired balance of nutrients for the optimum growth of the Leptospira organisms.

In preparing the compositions of the invention it is critical and essential to employ a detoxifying amount of an anion-exchange resin. Good results are obtained when employing from about five to 40 parts by weight of the resin and preferably from 10 to 20 parts of resin per part by weight of water-soluble lipid source in the finished medium. Suitable anion-exchange resins include weakly basic anion-exchange resins and strongly basic anion-exchange resins. Typical weakly basic anion-exchange resins may be prepared in accordance with the teachings of U.S. Pat. Nos. 2,591,574, 2,597,439 and 2,642,417. In such operations a vinyl-aromatic compound such as styrene is copolymerized with a minor proportion of a cross-linking agent such as divinylbenzene to produce a crosslinked polystyrene. The latter is then reacted in accordance with the teachings of the above patents with a halomethylating agent such as chloromethyl methyl ether to produce a halomethylated polystyrene. This halomethylated polymeric product is thereupon reacted with a primary or secondary amine or with a polyamine such as a polyalkylenepolyamine to produce the desired weakly basic anion-exchange resin. In preparing a strongly basic anion-exchange resin the halomethylated polymeric product, prepared in the above manner, is reacted with a tertiary amine to introduce a plurality of quaternary ammonium groups on the polymer structure and thereby produce the desired anion-exchange resin. Commercially available resins may be employed as, for example, the weakly basic anion-exchange resin sold by the Rohm and Haas Company under the trademark Amberlite IR-45 or the strongly basic anion-exchange resins sold by The Dow Chemical Company under the trademarks Dowex 1 and Dowex 2. In general, it is preferred to employ a resin having a high water-holding capacity indicating a relatively low degree of crosslinking, for example, a resin prepared by initially copolymerizing styrene with only about 2 to 4 percent of divinylbenzene.

Any suitable water-soluble lipid source may be employed, such as, for example, sodium oleate or a mixture of sodium oleate and sodium stearate. In a preferred embodiment, however, the lipid requirement of the culture medium is supplied in the form of a polysorbate, that is, a water soluble polyoxyethylene derivative of a sorbitan monoester of a fatty acid. Such polysorbates are available commercially from the Atlas Powder Company under the trandmark Tween. Of such polysorbates the polyoxyethylene derivative of sorbitan monooleate (polysorbate 80) and particularly the polyoxyethylene derivative of sorbitan monostearate (polysorate 60) are preferred.

In employing the medium, conventional bacterial culture techniques may be used. The usual precautions to avoid contamination are necessary. Good results have been obtained when the medium of the invention, after autoclaving, is inoculated with a vigorously growing culture of Leptospira organisms and thereafter maintained at a temperature of 28° to 32°C., preferably at about 30°C., for a period of time until the desired growth of the organisms is obtained. In large cultures it is desirable to pass a sterile mixture of air and carbon dioxide through the medium during the growing period and to maintain a moderate rate of stirring of the medium.

In large scale or continued operations it is generally convenient to prepare the components of the nutrient medium as concentrates which may then be diluted to form a particular batch of finished medium. In a representative operation, Eagle's Minimum Essential Medium was prepared as a concentrate containing ten-fold (10X) concentrations of the components by dissolving the following components in glass-distilled water at the indicated concentrations:

| 10 × EAGLE'S MEDIUM | |
|---|---|
| Component | Mg/100 ml. |
| NaCl | 6800.0 |
| KCl | 400.0 |
| $NaH_2PO_4 \cdot H_2O$ | 140.0 |
| $MgSO_4 \cdot 7H_2O$ | 200.0 |
| $CaCl_2$ (anhyd.) | 200.0 |
| Glucose | 1000.0 |
| L-arginine | 105.0 |
| L-Cystine | 24.0 |
| L-histidine | 31.0 |
| L-Glutamine | 292.0 |
| L-Isoleucine | 52.50 |
| L-Leucine | 52.40 |
| L-Lysine | 58.0 |
| L-Methionine | 15.0 |
| L-Phenylalanine | 32.0 |
| L-Threonine | 48.0 |
| L-Tryptophan | 10.0 |
| L-Tyrosine | 36.0 |
| L-Valine | 46.0 |
| Choline Chloride | 1.0 |
| Folic acid | 1.0 |
| i-Inositol | 2.0 |
| Nicotinamide | 1.0 |
| D-Calcium pantothenate | 1.0 |
| Pyridoxal HCl | 1.0 |
| Riboflavin | 0.10 |
| Thiamine HCl | 1.0 |
| Phenol red | 10.0 |
| $NaHCO_3$ | 2200.0 |

A Stock Buffer Concentrate was prepared by dissolving 16.6 grams of anhydrous disodium acid phosphate and 2.17 grams of potassium diacid phosphate in 1 liter of distilled water.

A Stock Salt Solution was prepared by dissolving 5.35 grams of ammonium chloride, 3.72 grams of magnesium chloride hexahydrate and 38.5 grams sodium chloride in 1 liter of distilled water.

A Stock Metals Concentrate was prepared by dissolving 64 milligrams of zinc sulfate, 48 milligrams of copper sulfate pentahydrate and 800 milligrams of ferrous sulfate heptahydrate in a solution consisting of 99 milliliters of distilled water and 1 milliliter of 10 percent hydrochloric acid solution.

A Stock Vitamin Concentrate was prepared in which each milliliter contained 320 micrograms each of vitamin $B_1$ and vitamin $B_{12}$ in distilled water.

A Lipid Concentrate was prepared by dissolving polysorbate 80 (Tween 80) in glass-distilled water to give a solution containing 10 grams of polysorbate 80 per 100 milliliters of solution.

DESCRIPTION OF THE PREFERRED EMBODIMENTS

The following examples illustrate the invention but are not to be construed as limiting the same.

Example 1

In a clean New Brunswick fermentor tank of 14 liters capacity, there was placed 5,355 milliliters of glass-distilled water and the following ingredients added thereto with stirring:

| Ingredient | Amount |
|---|---|
| Sodium bicarbonate | 10 grams |
| L-Cystine | 1 gram |
| Glucose | 6 grams |
| Stock Buffer Concentrate | 192 milliliters |
| Stock Salt Solution | 240 milliliters |
| Stock Metals Concentrate | 30 milliliters |
| 10 × Eagle's Medium | 120 milliliters |
| Stock Vitamin Concentrate | 3 milliliters |

The Stock Solution and Concentrates employed were those set forth above. To the resulting mixture there was added a mixture of 60 milliliters of the 10 percent polysorbate 80 solution and 60 grams of weakly basic anion-exchange resin (Amberlite IR-45). Prior to use in this mixture the commercial anion-exchange resin was washed with 50 percent ethanol and thereafter three successive times with hot water and then treated with sufficient sodium hydroxide to provide a pH of about 7.4

On completion of the mixing of the above described ingredients the total mixture was autoclaved for 45 minutes at 250°F. to provide a sterile medium. Thereafter the temperature of the fermentor tank and contents was brought to 30°C. and the pH of the contents adjusted to about 7.40 by flushing the solution with sterile carbon dioxide. After adjustment of the pH a sterile-filtered mixture of air and carbon dioxide was fed through the medium at a rate to provide about 575 milliliters of air and 11 milliliters of carbon dioxide per minute and mild agitation was provided for the medium by a small propeller stirrer driven at 150 r.p.m. Using aseptic techniques the medium was inoculated with 500 to 600 milliliters of a vigorously growing 4 to 5 day old culture of Leptospira canicola. The medium was maintained at the incubation temperature of 30°C. with continued stirring and the pH of the medium regulated by adjustment of the carbon dioxide content of the air stream passing through the medium. Ninety-six hours after the inoculation the following ingredients were added: 50 milliliters of aqueous 5 percent by weight solution of polysorbate 80, 25 milliliters of a 20 percent solution of glucose, 65 milliliters of 10 X Eagle's Medium, 25 milliliters of an aqueous 4 percent W/V solution of ammonium chloride, 40 milliliters of the Stock Buffer Concentrate and 40 milliliters of the Stock Salt Solution. At 120 hours after inoculation an additional 50 milliliters of aqueous 5 percent solution of polysorbate 80 was added and at 144 hours after inoculation the following additions were made: 25 milliliters of aqueous 5 percent solution of polysorbate 80, 25 milliliters of the Stock Metals Concentrate, 25 milliliters of aqueous 12 percent W/V solution of ammonium chloride, 1 gram of L-cystine in 3 milliliters of distilled water, and 3 milliliters of sterile-filtered Stock Vitamin Concentrate. All of the materials added after the initial inoculation were sterilized by autoclaving or by passage through a bacteriological filter and added to the fermentor using aseptic techniques. Excellent growth of the Leptospira organisms was observed and on the seventh day after the inoculation the culture was harvested and found to have a cell count of $3.3 \times 10^9$ organisms per milliliter.

Example 2

Two further portions of the medium of Example 1 were prepared and sterilized. One such portion was inoculated with a vigorously growing culture of Leptospira pomona organisms and the other with a vigorously growing culture of Leptospira icterohemorrhagiae organisms. Thereafter the media were incubated and maintained by the procedure of Example 1 to produce high yields of the respective organisms.

Example 3

Examples 1 and 2 are repeated except that polysorbate 60 is employed in place of polysorbate 80. Excellent growth of the organisms is obtained.

Example 4

3,600 Milliliters of glass-distilled water is placed in a clean fermentor tank and the following ingredients are added thereto with stirring:

| Ingredient | Amount |
|---|---|
| Polysorbate 60 Solution* | 20 milliliters |
| L-Cystine | 0.72 gram |
| Stock Salt Solution** | 160 milliliters |
| 10 × Eagle's Medium | 80 milliliters |
| Vitamin B$_1$ Solution*** | 2 milliliters |
| Vitamin B$_{12}$ Solution*** | 2 milliliters |
| Stock Metals Concentrate** | 20 milliliters |
| Stock Buffer Concentrate** | 128 milliliters |
| Glucose | 4 grams |

\* An aqueous solution containing 10 grams of polysorbate per 100 milliliters.
\*\* The Stock Solution and Concentrates were those set forth preceding Example 1.
\*\*\* The Vitamin Solutions each contained 400 micrograms of the respective vitamin per milliliter.

To the resulting solution there is added 40 grams of an anion-exchange resin. The latter is a strongly basic anion-exchange resin (Dowex 1) obtained by reacting trimethylamine with a halomethylated polymer in bead form. The halomethylated polymer is prepared by reacting chloromethyl methyl ether in the presence of a zinc chloride catalyst with beads of a copolymer of 98 percent of styrene and 2 percent of divinylbenzene. The anion-exchange resin is washed with several volumes of hot water and treated with sufficient aqueous sodium hydroxide solution to bring the pH of the resin to 7.4.

The mixture resulting from the foregoing operations is autoclaved to sterilize same and thereafter inoculated with Leptospira canicola organisms. The inoculation and subsequent incubation are carried out as in Example 1 to produce vigorous growth and a high concentration of the Leptospira organisms.

Equally good growth of Leptospira organisms is obtained when the anion-exchange resin above is replaced by an equal weight of an anion-exchange resin prepared in exactly similar fashion except that the resin is prepared from an initial copolymer of 96 percent styrene with 4 percent divinylbenzene or that the trimethylamine employed in preparing the Dowex 1 resins is replaced with N,N-dimethyl-ethanolamine.

The concentrated suspensions of Leptospira organisms obtained as products from the use of the medium of the present invention, as in the foregoing Examples, can be handled in conventional fashion for preparing whole culture, killed bacterins. For example, when sufficient growth of Leptospira organisms has been obtained, usually about 4 to 7 days after inoculation of the medium with a seed culture, a sterile solution of sodium ethylmercurithiosalicylate (thimerosal) is added to the culture to provide a final concentration therein of one part by weight of thimerosal per 10,000 parts of total culture medium. The culture is then held in a coldroom at about 40°F. for a period of time and thereafter tested for sterility. During the holding period the organisms undergo lysis releasing antigenic material. The resulting whole culture is suitable for use directly for immunization or may be diluted before such use. Alternatively, the products can be mixed with other antigens to provide polyvalent vaccines.

In representative operations, a culture of Leptospira pomona is prepared in accordance with the procedure of Example 2 and on completion of incubation is found to contain about $5 \times 10^9$ organisms per milliliter. The culture is treated with thimerosal at a concentration of 1:10,000 and thereafter diluted with physiological saline solution containing the same concentration of thimerosal to provide a vaccine containing the equivalent of $10^9$ organisms per milliliter, suitable for use at a dosage of 2 milliliters per calf to evoke immunity to leptospiral infection in cattle. Similarly whole cultures of Leptospira canicola and Leptospira icterohemorrhagiae, harvested and treated in the above fashion, may be mixed and the concentration of the mixture adjusted to provide the equivalent of about 400 million of each organism per milliliter, such mixture serving as a vaccine for dogs at a dosage of one milliliter per animal. These bacterial vaccines are also suitable for admixture with live virus vaccines such as canine distemper vaccine and infectious canine hepatitis vaccine to produce polyvalent vaccines which do not show interference in the immunogenic properties of the individual components.

It will be apparent to those skilled in the art that the particular mixture of amino acids, vitamins and minerals employed in the culture medium can be varied considerably without departing from the concept of the present invention provided that the essential components, namely a water-soluble lipid source and a detoxifying amount of anion-exchange resin, are incorporated in the medium.

I claim:

1. A sterile, protein-free culture medium composition, suitable for growing Leptospira organisms, which comprises a buffered aqueous solution of glucose, essential amino acids, mineral salts and vitamins, a water-soluble lipid source selected from the group consisting of sodium oleate, sodium stearate and polysorbates thereof, and from about five to about 40 parts by weight of a basic anion-exchange resin per part by weight of water-soluble lipid source in the finished medium.

2. A composition in accordance with claim 1 wherein the lipid source is a polysorbate.

3. The composition of claim 2 wherein the lipid source is the polyoxyethylene derivative of sorbitan monostearate.

4. The composition of claim 1 wherein the anion-exchange resin is a weakly basic anion exchange resin.

5. A method for culturing Leptospira organisms which comprises inoculating said organisms into a sterile, protein-free culture medium consisting essentially of a buffered aqueous solution of a water-soluble lipid source selected from the group consisting of sodium oleate, sodium stearate and polysorbates thereof, glucose and essential amino acids, mineral salts and vitamins in admixture with from about five to about 40 parts by weight of an anion-exchange resin per part by weight of water-soluble lipid source in the finished medium and maintaining said medium at an incubation temperature for said organisms until substantial multiplication of the organisms has occurred.

6. The method of claim 5 wherein the anion-exchange resin is a weakly basic anion-exchange resin.

* * * * *